(12) United States Patent
Varro et al.

(10) Patent No.: US 11,747,793 B2
(45) Date of Patent: Sep. 5, 2023

(54) SKILL MATCHING FOR CONTROL OF AN INDUSTRIAL PRODUCTION MACHINE

(71) Applicant: Siemens Aktiengesellschaft, Munich (DE)

(72) Inventors: Andras Varro, Lawrenceville, NJ (US); Gustavo Arturo Quiros Araya, Princeton, NJ (US); Patrick Eisen, Princeton, NJ (US); Frank Roelofs, Lauf (DE); Peter Kob, Heroldsberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 427 days.

(21) Appl. No.: 16/955,116

(22) PCT Filed: Aug. 9, 2018

(86) PCT No.: PCT/US2018/045986
§ 371 (c)(1),
(2) Date: Jun. 18, 2020

(87) PCT Pub. No.: WO2019/143383
PCT Pub. Date: Jul. 25, 2019

(65) Prior Publication Data
US 2021/0048803 A1  Feb. 18, 2021

Related U.S. Application Data

(60) Provisional application No. 62/620,103, filed on Jan. 22, 2018.

(51) Int. Cl.
*G06F 8/10* (2018.01)
*G05B 19/418* (2006.01)
(Continued)

(52) U.S. Cl.
CPC ... *G05B 19/41865* (2013.01); *G05B 19/4183* (2013.01); *G05B 19/41845* (2013.01);
(Continued)

(58) Field of Classification Search
CPC .......... G05B 19/41865; G05B 19/4183; G05B 19/41845; G05B 19/41885;
(Continued)

(56) References Cited

U.S. PATENT DOCUMENTS 6,647,301 B1  11/2003  Sederlund et al.
7,203,628 B1  4/2007  St. Ville
(Continued)

FOREIGN PATENT DOCUMENTS

CN  1492210 A  *  4/2004
CN  101517531 A  8/2009
(Continued)

OTHER PUBLICATIONS

International Search Report dated Nov. 19, 2018; International Application No. PCT/US2018/048661; 13 pages.
(Continued)

*Primary Examiner* — Kandasamy Thangavelu

(57) ABSTRACT

Automated skill matching is provided in industrial control. The interfaces (12, 17) and/or the production processes (13, 18) of the controller (16) and machine (11) are matched. The matching of the interfaces (12, 17) links parameters except for optional parameters to check for incompatibility. The matching of the production processes (13, 18) uses a cross-product of the process (13) of the machine (11) with the process (18) of the controller (16) to check for incompatibility. The skill checking guides manual confirmation of compatibility, reducing downtime and reducing engineering
(Continued)

or programming time. The machine (11) is more likely to operate correctly with the controller (16) due to the automated skill matching.

20 Claims, 4 Drawing Sheets

(51) Int. Cl.
G06F 11/30 (2006.01)
G06F 9/06 (2006.01)
(52) U.S. Cl.
CPC ......... G05B 19/41885 (2013.01); G06F 8/10 (2013.01); G06F 9/06 (2013.01); G06F 11/30 (2013.01)
(58) Field of Classification Search
CPC .... G05B 2219/31229; G05B 19/41815; G06F 8/10; G06F 9/06; G06F 11/30; Y02P 90/02
See application file for complete search history.

(56) References Cited

U.S. PATENT DOCUMENTS

| | | | |
|---|---|---|---|
| 7,624,075 B2 | 11/2009 | Lucco et al. | |
| 7,627,541 B2 | 12/2009 | Lucco et al. | |
| 9,874,868 B2 | 1/2018 | Lorenz et al. | |
| 10,026,049 B2 * | 7/2018 | Asenjo | G06Q 10/06 |
| 10,877,470 B2 * | 12/2020 | Burd | G05B 23/0294 |
| 2003/0097197 A1 | 5/2003 | Parent et al. | |
| 2003/0163296 A1 | 8/2003 | Richards | |
| 2004/0098153 A1 | 5/2004 | Neudeck | |
| 2006/0241792 A1 * | 10/2006 | Pretlove | G06F 3/011 700/83 |
| 2009/0089700 A1 | 4/2009 | Gu et al. | |
| 2010/0148917 A1 | 6/2010 | Ozawa | |
| 2010/0153771 A1 | 6/2010 | Gordon et al. | |
| 2013/0191106 A1 | 7/2013 | Abruzere et al. | |
| 2015/0323914 A1 | 11/2015 | Majewski et al. | |
| 2016/0330082 A1 | 11/2016 | Bliss et al. | |
| 2017/0039057 A1 | 2/2017 | Stefan | |
| 2017/0053050 A1 | 2/2017 | Kothari et al. | |

FOREIGN PATENT DOCUMENTS

| | | | | |
|---|---|---|---|---|
| CN | 101517533 A | | 8/2009 | |
| CN | 102749885 A | * | 10/2012 | ......... G05B 19/4185 |
| CN | 103737592 A | | 4/2014 | |
| CN | 105278448 A | | 1/2016 | |
| JP | 2004502205 A | * | 1/2004 | ......... G06F 11/1633 |
| KR | 20130121350 A | * | 11/2013 | ....... G06K 19/06037 |
| KR | 101411485 B1 | * | 6/2014 | ............. Y02P 90/30 |
| WO | WO 02093355 A1 | * | 11/2002 | .......... G06F 3/1285 |
| WO | 0067131 A2 | | 11/2006 | |
| WO | 2009045865 A2 | | 4/2009 | |
| WO | 2015167558 A1 | | 11/2015 | |
| WO | 2017086986 A1 | | 5/2017 | |

OTHER PUBLICATIONS

Joseph D. Masters et al. "Unique Domination in Cross-Product Graphs"; Congressus Numerantium 118 (1996), pp. 49-71.
Patrick Blackburn, Johan Bos, and Kristina Striegnitz "Learn Prolog Now!"
Bernhard K. Aichernig "Logic & Logic Programming Foundations: Unification"; Institute for Software Technology Graz University of Technology Austria.
Xie Huanmin et al: "Investigation of industrial combustion process simulation technology", Proceedings of Shandong Institute of Construction, vol. 7 No. 4, DOI: 10. 13349/j. cnki. jdxbn. Apr. 6, 1993, p. 24-32, Dec. 31, 1993.
Yining, Ding: "Research on Key Technology of Automotive Cluster PCB Automatic Soldering Production Line", Publish date: Jul. 15, 2011.
Zhang, Xiao-Long: "Monitoring and supervising of iron and steel production processes with real-time data streams", Publish date: Jun. 16, 2013.

* cited by examiner

SKILL MATCHING FOR CONTROL OF AN INDUSTRIAL PRODUCTION MACHINE

RELATED APPLICATIONS

The present patent document is a national phase filing under 35 U.S.C. § 371 of International Patent Application No. PCT/US2018/045986, filed Aug. 9, 2018, which claims the benefit of the filing date under 35 U.S.C. § 119(e) of Provisional U.S. Patent Application Ser. No. 62/620,103, filed Jan. 22, 2018, which are hereby incorporated by reference in their entirety.

BACKGROUND

The present embodiments relate to skill matching for control of an industrial production machine. A machine is added to a manufacturing process, such as for a refit, replacement, upgrade, or as part of initial installation. The machine is to be controlled by a controller. For proper operation, the information exchanged between the machine and the controller matches. The information to be exchanged includes interface information (e.g., parameters) and process information (e.g., synchronization of function). The functionality requested by the production line controller and the functionality provided by the machine are matched.

The matching of requested and provided functionality is done manually. A programmer may spend hundreds of engineering hours to make sure the interfaces and processes match. In some refit, repair, or replacement situations, the matching results in hours or days of downtime because of hidden parameter and skill incompatibility.

SUMMARY

By way of introduction, the preferred embodiments described below include methods, systems, and computer readable media for automated skill matching in industrial control. The interfaces and/or the production processes of the controller and machine are matched. The matching of the interfaces links parameters to check for incompatibility. Optional parameters may be matched or considered, but are optionally matched. The matching of the production processes uses a cross-product of the process of the machine with the process of the controller to check for incompatibility. The skill checking guides manual confirmation of compatibility, reducing downtime and reducing engineering or programming time. The machine is more likely to operate correctly with the controller due to the automated skill matching.

In a first aspect, a system is provided for skill matching in industrial control. A production machine is in an industrial production line. The production machine has a production machine interface responsive to a plurality of first parameters and has a production machine process responsive to first information. A controller is to control the production machine. The controller has a controller interface responsive to a plurality of second parameters and has a controller process responsive to second information. A matching processor is configured to first match the first and second parameters and to second match synchronization of the production machine process with the controller process based on exchange of the first and second information between the controller and the production machine. The matching processor is configured to indicate an incompatibility of the production machine with the controller based on the first match, the second match, or both the first match and the second match.

In a second aspect, a method is provided for skill matching in an industrial control system. A processor compares a process model of a controllable industrial equipment to a process model of a supervisor of the controllable industrial equipment. The processor identifies an incompatibility of the process model of the controllable industrial equipment with the process model of the supervisor based on the comparing.

In a third aspect, a method is provided for skill matching in an industrial control system. A processor compares parameters of an interface of a controllable industrial equipment to parameters of an interface of a supervisor of the controllable industrial equipment. The processor identifies an incompatibility of the interface of the controllable industrial equipment with the interface of the supervisor based on the comparing.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Skill matching is automatically performed for production machines. To simplify and speed up the replacement of machines or components in a production line, skill matching is used to detect any incompatibility between production machines and possible causes for incompatibility. An augmented unification stemming from logic programming and/or a graph algorithm for the synchronous cross product of finite state automata provide two examples of how to automatically perform the goal of the incompatibility check.

The task of skill matching may be divided into interface signature matching and synchronization matching. A machine provides multiple functions that may be controlled by a supervisor. If the machine-readable description of the required functionality from the supervisor side and provided functionality from the machine side is available, the time and resources needed for finding compatibility issues are reduced by using the interface signature and synchronization matching.

The process models of the supervisor and the machine may be matched with each other using a synchronous cross product. The result of this matching reveals the incompatibilities regarding synchronization and termination, so the process incompatibility may be addressed. Some incompatibilities may be solved automatically, such as by adding links in a process to matching ending conditions.

The parameters requested by the supervisor and the process parameters provided and accepted by the machine may be matched by interface signature matching using augmented unification for the functions in the process model. The interface matching produces a list of incompatibilities. Some of these incompatibilities may be solved automatically by converters or adapters, minimizing the need for manual engineering.

Currently, matching is done by hand, meaning that a large number of parameters and synchronization steps are checked by the engineer without augmented unification or synchronous cross product. The skill matching based on augmented unification and/or synchronous cross product may significantly decrease the time needed for replacing machines in the production lines with new ones in case of malfunction, upgrade, or another reason. The functionality may be integrated in the supervisor's firmware or in the control software of the machine. The machine or controller is made to operate in an improved manner due to the skill matching. It is the nature of machine interfaces that results in a need for the skill matching.

Figure 1:
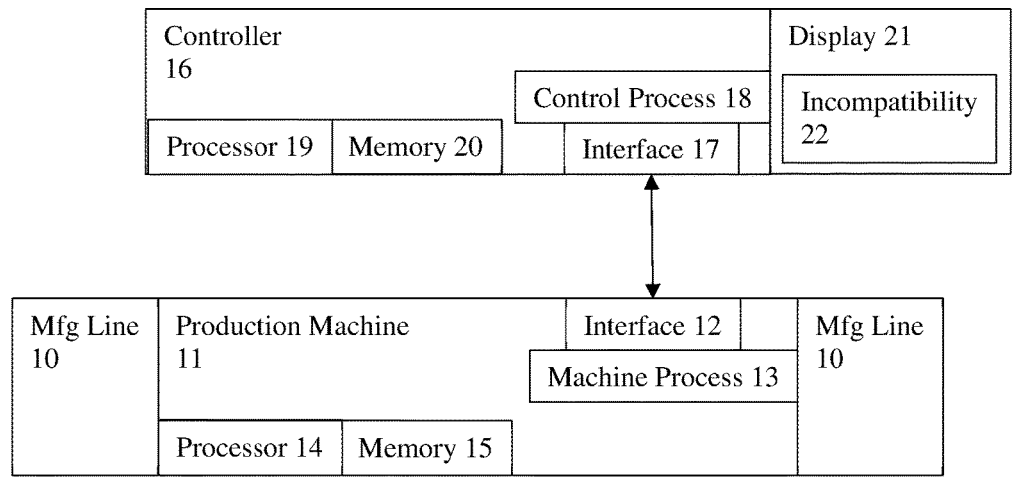
FIG. 1 is a block diagram of one embodiment of a system for skill matching in industrial control.

FIG. 1 shows one embodiment of a system for skill matching in industrial control. When the production machine 11 is to be added, is a replacement, is refit, or is changed, the compatibility of the resulting machine interface 12 with the controller interface 17 and/or the resulting machine process 13 with the control process 18 is checked. Unification of the interfaces 12, 17 and/or a cross product of the processes 13, 18 provide the skill matching.

The system includes the controller 16, a display 21, a manufacturing line 10, and the production machine 11. Additional, different, or fewer components may be provided. For example, the production machine 11 is provided to operate independently or not part of the manufacturing line 10. As another example, a separate workstation, computer, and/or server is provided for performing the skill matching for the controller 16 and the production machine 11. While the skill matching is characterized between the controller 16 and the production machine 11, in other embodiments the skill matching is between the production machine 11 and another production machine and/or between the controller 16 and another controller. Interfaces and/or synchronization processes between any interacting components of the industrial system or manufacturing may be matched.

Figure 2A:
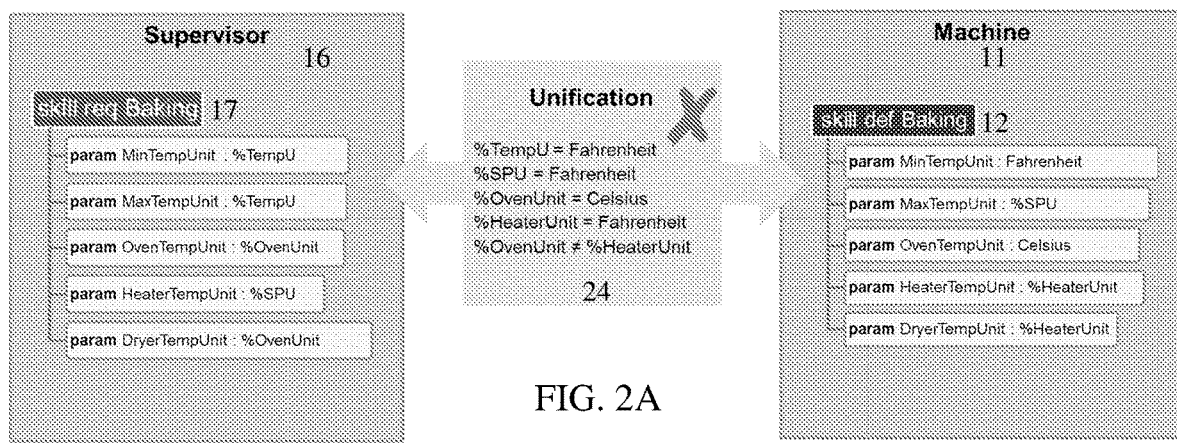
FIGS. 2A and 2B illustrate examples of matching of interfaces.
Figure 2B:
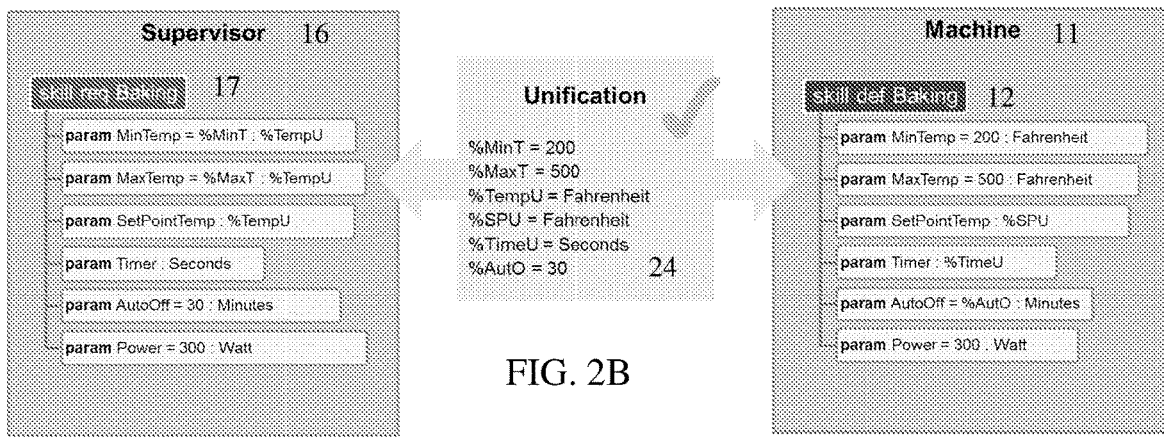
Figure 3:
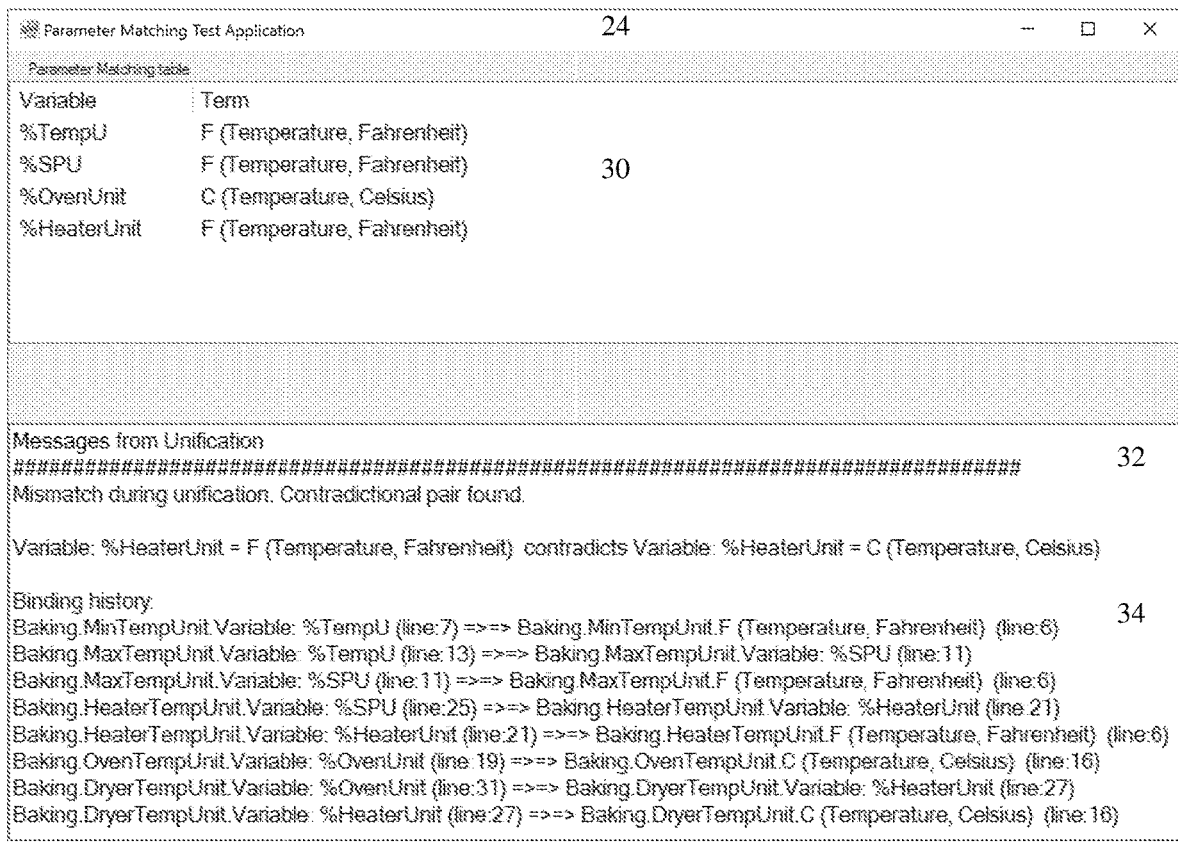
FIG. 3 illustrates an example output from the matching of FIG. 2A.
Figure 4:
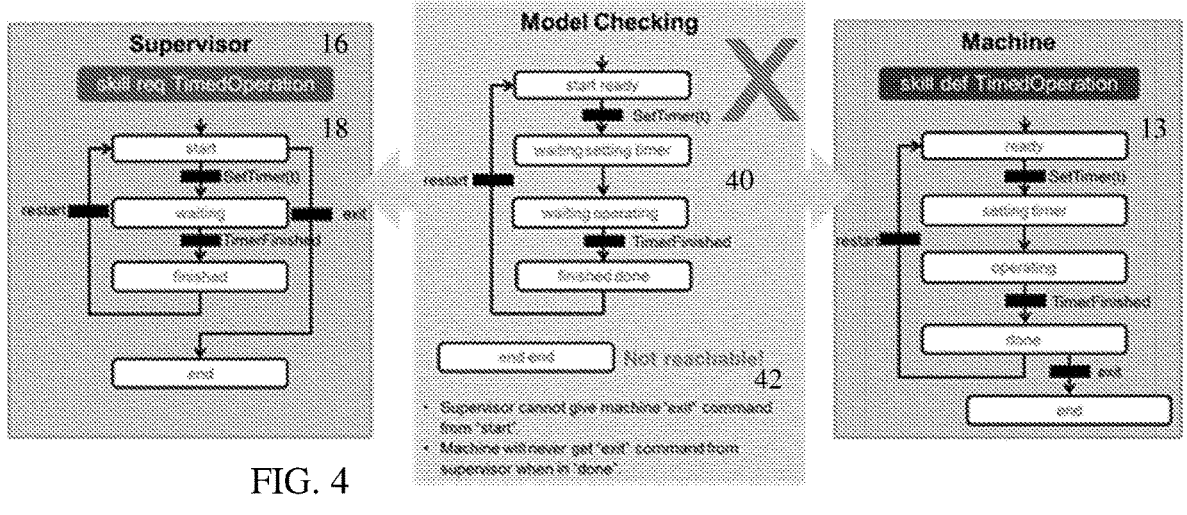
FIG. 4 illustrates an example matching of production processes.
Figure 5:
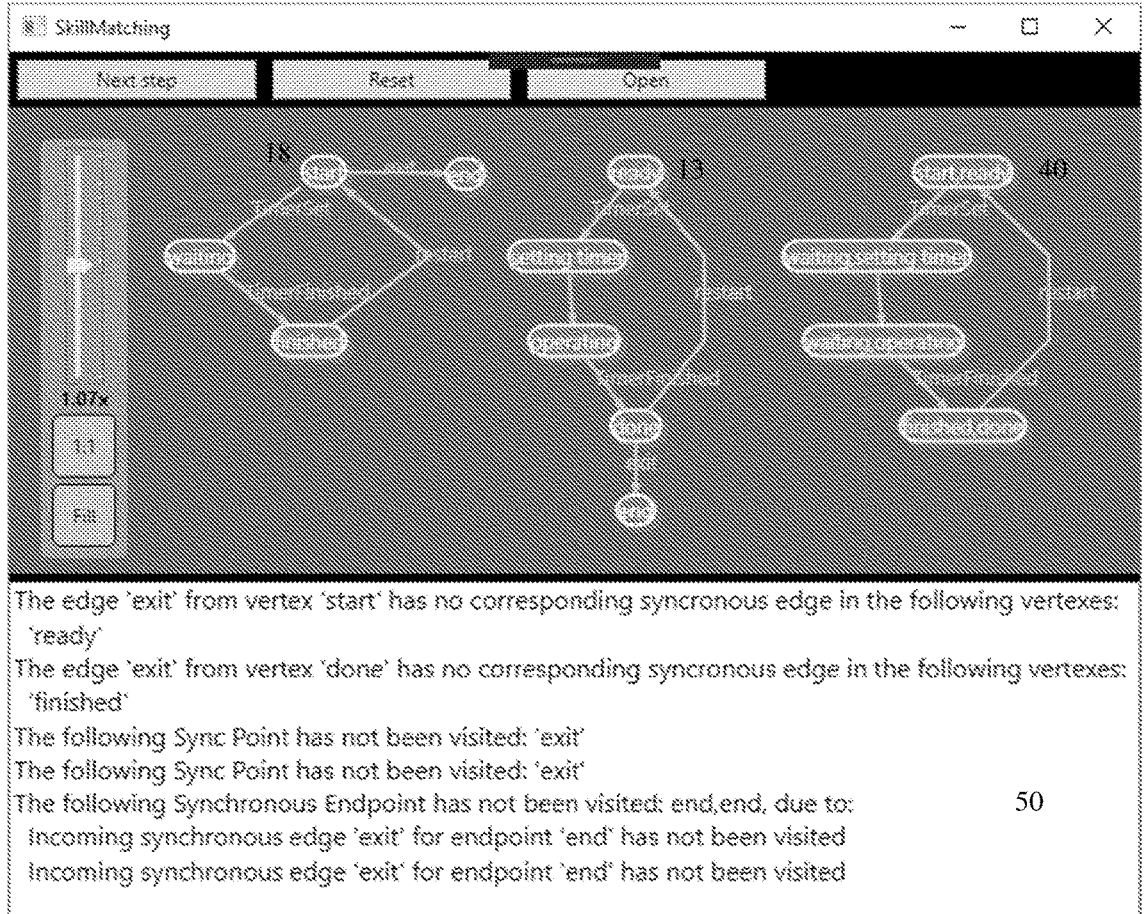
FIG. 5 illustrates an example output from the matching of FIG. 4.
Figure 6:
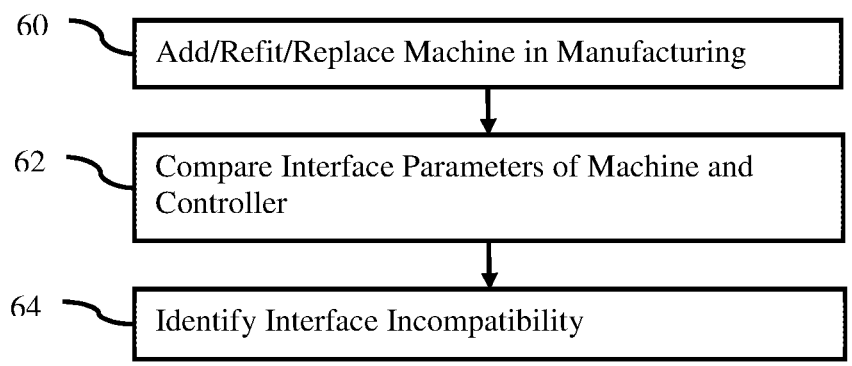
FIG. 6 is a flow chart diagram of an embodiment of a method for skill matching interfaces in an industrial control system.
Figure 7:
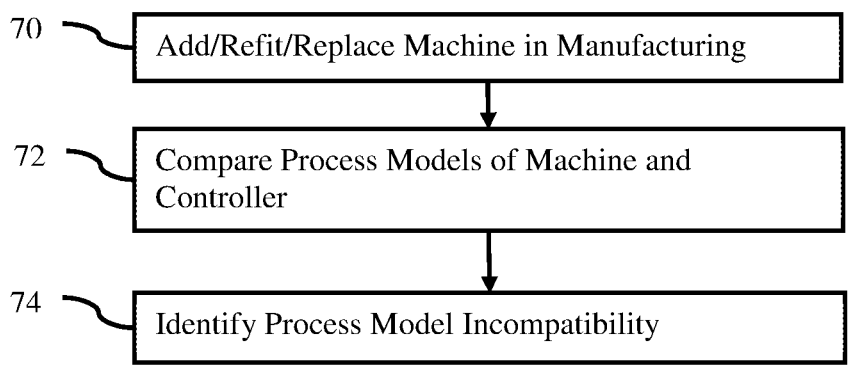
FIG. 7 is a flow chart diagram of an embodiment of a method for skill matching processes in an industrial control system.

The system implements the method of FIG. 6, FIG. 7, or another method. FIGS. 2 and 3 show an example skill matching of interfaces using augmented unification, and FIGS. 4 and 5 show an example skill matching of processes using a synchronization cross product.

The production machine 11 is a machine in an industrial production line. The machine 11 acts on an object, liquid, or gas to alter for producing a product. The machine 11 is part of a manufacturing process. For example, the production machine 11 is an oven, conveyor, lath, drill press, molder, press, extruder, cutter, welder, mixer, cooker, centrifuge, valve, actuator, picker, placer, solderer, selector, measurer, robot, skimmer, or other machine used in production or manufacturing. FIGS. 2 and 4 use an oven for baking as an example machine 11.

The production machine 11 is part of the manufacturing line 10. The manufacturing line 10 uses one or more machines to produce a product as part of a manufacturing process. Any combination of machines, including the production machine 11, is used. The manufacturing line 10 may include manual processes performed by a person and includes at least one automated or semi-automated process performed by the production machine 11.

The production machine 11 is controllable. Using the processor 14, the production machine 11 responds to signals from the controller 16 and/or other source to implement the machine process 13 based on parameters of the interface 12. More than one local processor 14 may be used. The processor 14 operates pursuant to instructions stored in the memory 15 or another memory. The parameters of the interface 12 and/or the machine process 13 may be stored in the memory 15 or another memory. The production machine 11 is programmed to implement one or more acts in manufacturing. The acts to perform, the sequence, the timing, the amount, and/or another characteristic of operation of the production machine 11 are programmable and controllable.

The production machine interface 12 is responsive to a plurality of parameters. The parameters each have a name and unit of measurement. The parameters may be a constant or a variable. In one embodiment, the parameters include unit and value or value range and may be expressed as constants (literals) or as variables. In the example of FIG. 2A, the parameters of the interface 12 are minimum and maximum temperature units, an oven temperature unit, a heater temperature unit, and a dryer temperature unit. The units of measurement are Fahrenheit and Celsius. In the example of FIG. 2B, the parameters of the interface 12 are minimum and maximum temperature units, set point temperature, timer, auto off, and power. The units of measurement are Fahrenheit, seconds, minutes, and watts. The "%" symbol designates the parameter as a variable. The parameters with variables include a variable name. Additional, different, or less information (i.e., characteristics) may be provided for each parameter. Additional, different, or fewer parameters may be provided.

The interface 12 is used for communication with an interface 17 of the controller 16 or another device. The parameters define the information that may be exchanged during the matching process, such as values of variables and the unit of measurement of those values. One or more parameters may be labeled as optional, such as where the parameter is not expected to be communicated for use by the other device other than reporting. Optional parameters may be useful in some situations, but not always required, such as when the optional parameters are used just for an advanced or specialized feature or functionality.

The machine process 13 includes a chain of steps or procedures. Start and end steps are provided. From the start to the end, any number of steps are provided. A machine function may be a chain of procedures with one or more start points and one or more end points. The procedures may start automatically or may be started by a synchronous signal from the controller 16. The steps correspond to states of the machine 11. The steps may be internal actions to be taken by the machine 11. One or more steps may be triggered, such as by a sensor of the machine 11 or based on an external control signal, such as from the controller 16. The external control signal is a synchronization point where the machine process 13 waits for the control signal or waits after sending a signal to the controller 16. When the machine 11 arrives at a point where the machine 11 must receive a signal from the controller 16 to go further, the machine 11 enters in a wait state. These latter waiting points are synchronization points (SyncPoints) and are represented with black blocks in FIG. 4.

FIG. 4 shows an example of the machine process 13. The machine process 13 starts in a ready state. The machine 11 transitions to a setting timer state in response to a set timer synchronization signal from the controller 16. After receiving the synchronization signal, the process 13 sets the time and begins operating. During the operating state, the machine 11 checks for a control signal for the timer being finished. The timer finish synchronization signal is generated internally or received from the controller 16. The machine 11 then enters a done state, which either transitions to the ready state or an end state based on which of an exit or restart signal is received from the controller 16. Other machine processes with additional, different, or fewer states and/or synchronization points may be provided.

The controller 16 is a supervisor or another control system for controlling operation of the production machine 11. For example, the controller 16 is a programmable logic controller (PLC), a logic unit, field panel, remote terminal unit (RTU), actuator controller, sensor controller, and/or monitoring workstation.

The controller 16 controls just the production machine 11 or controls the production machine 11 and other components of the manufacturing line 10. The controller 16 may be a local controller or a remote controller. Wired or wireless communications over a network or directly to the machine 11 may be used. The processor 19, based on instructions in the memory 20, uses the interface 17 to follow a control process 18. The interface 17 and/or control process 18 are stored in the memory 20. Additional, different, or fewer devices may be provided for the controller 16.

The controller 16 is controllable and/or controls the production machine 11. Using the processor 19, the controller 16 responds to signals from the production machine 11 and/or other source to implement the control process 18 based on parameters of the interface 17. Using the processor 19, the controller 16 sends signals to the production machine 11 to control the machine process 13 based on parameters of the interface 12. The controller 16 is programmed to implement one or more acts in manufacturing. The acts to perform, the sequence, the timing, the amount, and/or another characteristic of operation of the production machine 11 are programmable and controllable by the controller 16.

The control interface 17 is formed from and/or responsive to a plurality of parameters. The parameters each have a name, value, value range, and/or unit of measurement. The parameters may be a constant or a variable. In the example of FIG. 2A, the parameters of the interface 17 are minimum and maximum temperature units, an oven temperature unit, a heater temperature unit, and a dryer temperature unit. No units of measurement are provided but may be. The "%" symbol designates a variable within the parameter definition. The parameters with variables include a variable name. FIG. 2B shows other parameters and corresponding definitions, including using values. Additional, different, or less information may be provided for each parameter. Additional, different, or fewer parameters may be provided.

The control interface 17 is used for communication with the machine interface 12 of the production machine 11 or another device. The parameters define the information that may be exchanged for the matching, such as values of variables and the unit of measurement of those values. One or more parameters may be labeled as optional, such as where the parameter is not expected to be communicated for use in manufacturing and/or other than reporting. Optional parameters may be useful in some situations, but not always required, such as when the optional parameters are used just for an advanced or specialized feature or functionality.

The control process 18 includes a chain of steps or procedures. Start and end steps are provided. From the start to the end, any number of steps are provided. A control function may be a chain of procedures with one or more start points and one or more end points. The procedures may start automatically or may be started by a synchronous signal from the production machine 11. The steps correspond to states of the controller 16 or control process. The steps may be internal actions to be taken by the controller 16. One or more steps may be triggered, such as by a sensor or based on an external signal, such as from the production machine 11. The external signal is a synchronization point where the control process 18 waits for the signal or waits after sending a signal. When the controller 16 arrives at a point where the controller 16 must receive a signal from the production machine 11 to go further, the controller 16 enters in a wait state, at least for control of the machine 11. These latter waiting points are synchronization points (SyncPoints) and are represented with black boxes in FIG. 4.

FIG. 4 shows an example of the control process 18. The control process 18 starts in a start step. The controller 16 sends a set timer synchronization signal to the machine 11, such as in response to sensed activation or availability of product on a conveyor. After sending the synchronization signal, the control process 18 enters a wait state or counter state waiting for a timer to finish or to receive a signal indicating a timer as finished. Once the timer is finished, a timer finish signal is sent to the machine 11 or received from the machine 11. The control process 18 then enters a finished state until a restart is generated or received, such as by sensing product on a conveyor for baking. The control process 18 may be exited where an exit signal is generated or received while in the start state of the control process 18. Other control processes with additional, different, or fewer states and/or synchronization points may be provided.

For skill matching of the interfaces 12, 17 and/or the machine and control processes 13, 18, a matching processor is configured to perform the matching. For installing a new production machine 11, refit, replacement, altering the production machine 11 (e.g., interface 12 and/or machine process 13) and/or altering the controller 16 (e.g., interface 17 and/or control process 18), the matching processor is configured to perform the skill matching. The matching processor is implemented by the processor 19 of the controller 16, by the processor 14 of the production machine 11, and/or by another processor (e.g., computer, workstation, or server).

The matching processor is configured by firmware, software, and/or hardware. The instructions for configuring the matching processor are stored in the memory 15, the memory 20, and/or another memory. The matching processor performs the comparison and identification acts of FIGS. 6 and/or 7 or other acts based on the configuration.

In one embodiment, the matching processor performs interface signature matching. The parameters of the control interface 17 are matched with the parameters of the machine interface 12. Each machine function is described by parameters. As shown in FIGS. 2A and 2B, a parameter describes either a requirement from the controller 16 (left hand side) or a capability of the function of the machine 11 (right hand side). The interface signature matching matches the parameters requested by the controller 16 with the capabilities provided by the machine 11 and/or parameters requested by the machine 11 with the control provided by the controller 16. The matching accounts for the names, units of measurement, value, use as a concrete value (e.g., constant or predetermined), and/or use as a variable. FIG. 2A shows a simplified example for the parameter units. The same approach may be used for names or other parameter characteristics. FIG. 2B shows another example including values and links between variables in the parameter definitions. The matching determines if the parameter set required by the controller 16 may be fulfilled by the machine 11 or vise versa. The matching determines any variable substitutions and/or incompatibilities.

The interface skill match is based on compatibility of the names and units of the parameters of the control interface 17 with the names and units of the parameters of the machine interface 12. Other characteristics may be matched. In the example of FIG. 2A, the names of the parameters are used to match the names of linked variables and the units. In the example of FIG. 2B, the names of the parameters are used to match the names of linked variables, values, and the units.

The skill match of the interfaces 12, 17 uses an augmented unification. Instead of unifying between logic programming expressions, the unification is between the controller interface 17 and the machine interface 12. Unification employed in logic programming systems are modified to unify between interfaces 12, 17 in industrial control. The augmentation includes variation in the rules or instructions used in the match, such as to account for machine interface programming and/or parameters that do not have to be matched.

Each parameter is uniquely identifiable by its name. All the parameters should have a matching pair on both interfaces 12, 17 based on their identifier (name). Otherwise, an incompatibility error is signaled for the parameter, providing the identifier. Parameters defined as "optional" do not trigger an incompatibility error as no matching pair is required. In the examples of FIGS. 2A and 2B, each parameter name in each of the interfaces 12, 17 are paired between the interfaces. There are no parameter names identified as optional. No incompatibility is indicated based on the name matching.

For matching, a variable is uniquely identifiable by the variable name. In the example of FIG. 2A, "%" designates a variable in the parameter definition. Other labels, whether embedded in the name or stored separately, may be used. Matching a parameter from one interface 12 or 17 means that the parameter information (e.g., name, unit) matches the corresponding information of the matched parameter on the other interface 17 or 12. Variables are substituted by values to obtain a match where a value is provided. The names of the variables and/or the units are used for substitution. A variable may be substituted by another variable or a concrete value. A variable may be substituted by any number of other variables. A variable may be substituted by one and only one constant. Constants with the same value are equivalent. A constant matches another constant with the same value, otherwise a mismatch occurs.

In the example of FIG. 2A, the parameter name MinTempUnit in the control interface 17 is linked to the parameter of the same name in the machine interface 12. This parameter in the control interface 17 is a variable "% TempU." This parameter in the machine interface 12 is a unit of measurement—"Fahrenheit." Based on the substitution rules, "% TempU" is substituted with "Fahrenheit." Since the parameter "MaxTempUnit" is also associated with the variable "% TempU," "Fahrenheit" is assigned to "MaxTempUnit." Based on linking parameter names, "MaxTempUnit" in the interface 17 is linked with "MaxTempUnit" in the interface 12. Based on the substitution rules, the variable "% SPU" of "MaxTempUnit" in the control interface 12 is substituted with "Fahrenheit." Given the substitution of "% SPU" with "Fahrenheit," the "HeaterTempUnit" of the control interface 17 is substituted with "Fahrenheit." By linking "HeaterTempUnit" between the interfaces 12, 17, then the variable "% HeaterUnit" is substituted with "Fahrenheit." Similarly, parameter names "OvenTempUnit" in both interfaces result in substituting "% OvenUnit" with "Celsius." "% OvenUnit" is also linked to the parameter "DryerTempUnit," which corresponds to both of variables "% OvenUnit" and "% HeaterUnit." These two variables are substituted by "Fahrenheit" and "Celsius." Since a constant cannot have more than one value, there is an incompatibility based on the substitutions. FIG. 2A shows the mapping of the units in the unification report 24. A similar process may be made for constant values (e.g., 10) rather than units.

In the example of FIG. 2B, constant values and units are included in the parameter definitions. the parameter name MinTemp in the control interface 17 is linked to the parameter of the same name in the machine interface 12. This parameter in the control interface 17 has two linked variables "% TempU" and "% MinT." This parameter in the machine interface 12 is a unit of measurement—"Fahrenheit" and a value "200." Based on the substitution rules, "% TempU" is substituted with "Fahrenheit" and "% MinT" is substituted with "200." Since the parameter "MaxTemp" is also associated with the variable "% TempU," "Fahrenheit" is assigned to "MaxTemp." Based on linking parameter names, "MaxTemp" in the interface 17 is linked with "MaxTemp" in the interface 12. The variable "% MaxT" in the interface 17 is matched with the value "500" from the interface 12. The SetPointTemp parameter of the interface 17 is matched with the SetPointTemp of the interface 12. Based on the substitution rules, the variable "% SPU" of "SetPointTEmp" in the control interface 12 is substituted with "Fahrenheit," which was previously assigned to "% TempU." By linking "Timer" between the interfaces 12, 17, then the variable "% TimeU" is substituted with "Seconds." The "AutoOff" parameters of the two interfaces match in units ("Minutes") and the value 30 is assigned to the variable "% AutoOff" based on the matching rules. The "Power" parameters of the two interaces 12, 17 match, including the value of "300" and the unit of "Watts." There are no incompatabilities, so the matching indicates that the interfaces 12, 17 are compatible. FIG. 2B shows the mapping of the units in the unification report 24.

Where a substitution is made, the substitution information is stored for the variable, allowing tracking of substitution for any variable. A variable substituted by another variable saves the other variable's substitution history, the substituting variables and/or the constant. The storage allows tracking of the substitutions through various constants and/or variables for a given variable or constant. Where a variable signals an error, the stored tracking of substitution provides the association history in case that the variable has already been associated with a constant and is matched against a different constant. The association history contains the current, otherwise faulty, association, or the conflict (i.e., both conflicting associations) are stored. In the example in FIG. 2A, one parameter has an association error because of the mismatch between the values assigned to the variables % OvenUnit and % HeaterUnit. Keeping the substitution history makes it possible to display elaborated information on where the incompatibility arose.

As a final step, a list of all the variables in each interface 12, 17 that are not labeled as optional are checked for association. Each variable should have a unit and/or value assigned. An error is issued for every variable without an associated constant or unit. Other rules and/or checks may be used.

The unification 24 of FIG. 2A or 2B, with or without the listing of parameters and parameter characteristics of FIG. 2A or 2B, is output and/or used to correct the interfaces 12, 17. FIG. 3 shows another example output unification 24. The variables and associated constants are shown at 30 where a first assigned constant is provided even where incompatible. A mismatch message 32 is provided with a binding history (i.e., substitution history) 34 for one or more of the variables. Other outputs, such as a notice regarding just that an incompatibility exists or just the incompatible variables, parameter names, and/or units, may be provided.

The output is used to manually correct. A programmer may review and correct the programming of the controller 16 and/or the machine 11 to provide for matching (i.e., remove the incompatibility). Alternatively or additionally, the matching processor performs the fix automatically. A converter or adaptor may be applied, such as converting "Fahrenheit" to "Celsius" so that the units as expected by a given interface 12, 17 are provided to the interface.

In one embodiment, the matching processor performs synchronization matching. The control process 18 is matched with the machine process 13 to check for synchronization through the processes. The ability to start, change states, and end with exchange of signals (e.g., data) between the processes to properly progress through the processes is checked. The synchronization of the production machine process 13 with the control process 18 is based on exchange of information or signals between the controller 16 and the production machine 11. This synchronization is checked by synchronization matching. The machine 11 may provide multiple functions and works together with several other machines (e.g., the controller 16), so the synchronization check makes sure that the machine process 11 works synchronously with the other devices.

The matching checks for synchronization based on the steps (e.g., functions or procedure acts) and synchronization points of the processes 13, 18. The chain of procedures and the synchronization points are represented as a graph for each process 13, 18. The procedures or steps are the vertices and the named edges are synchronization points. Unlabeled arrows (edges) represent internal steps that require no synchronization (i.e., no external synchronization). Other graph representations may be used, such as including decision points, alternative synchronization points for a same link (i.e., between the same steps), and/or more than one synchronization point along a given edge.

FIG. 4 shows an example. The matching may be between more than two devices. The matching between different machines may route through the controller 16, so the control process 18 may be matched with multiple machines 11 while the machine process 13 of each machine 11 is matched with just the control process 18.

Given the graphs, the matching uses a synchronous cross product of the control process 18 with the production machine process 13. The starting points of the steps for the production machine process 13 and the control process 18 are linked. The links between the steps are labeled as internal or the synchronization points in the cross product. To determine if the function required by the controller 16 may be fulfilled by the machine 11, the synchronous cross product (synchronous graph 40) of the requested and provided functionality is created.

Any process for generating a graph cross product may be used. In one example, the synchronous cross product graph takes the starting point from the control process 18 (left supervisor graph) and the starting point from the machine process 13 (right machine graph) and creates a new graph vertex as a starting point, combining (e.g., composing) the original vertices into the new vertex (e.g., start/ready). A new vertex is created and added to the synchronous cross product graph if there is an unlabeled edge between the current and the next vertex on either the control process 18 or the machine process 13. This represents an internal step that occurs on the corresponding side. In the example of FIG. 4, the waiting from the control process 18 is assigned to the two vertices "setting timer" and "operating" associated with the internal edge in the machine process 13. If there are multiple states for each process 13, 18 between synchronization points, then branches or vertices are created for each possible combination.

A new vertex is created and added to the synchronous cross product graph 40 where there is a named edge between the current and the next vertex in both the control process 18 and the machine process 13. The created vertex represents a synchronous step that occurs on both sides. Where a named edge is in only one of the processes 13, 18, then there is a mismatch.

The cross-product graph 40 is used to detect incompatibilities. One or more rules are followed to detect an incompatibility. Any rules may be used. Below are three example rules used together in one embodiment. Additional, different, or fewer rules may be used.

For example, missing synchronization points are detected by identifying states in the synchronous graph 40 where synchronization points appear in the corresponding states of the original graphs, but which are not followed in the synchronous graph 40 because of a missing match. In case of a named edge which does not exist on both sides, but there is another edge which advances both graphs to a next synchronous vertex, an error is signaled with the name of the current vertex and the name of the missing edge. This error indicates that the controller 16 or the machine 11 in the current state cannot accept the missing synchronization signal from the other.

In another example rule, after the synchronous cross product graph 40 has no more nodes to add, the graph 40 is checked that all named edges from the processes 13, 18 are visited. An error is raised with the names of any missing named edges. A missing named edge means that the corresponding synchronization point is not reachable. FIG. 4 shows an example. The "exit" named edge from the control process 18 and the "exit" named edge from the machine process 13 are not included in the graph, so are not reachable. The controller 16 cannot give the exit command.

In yet another rule, after the synchronous cross product graph 40 has no more nodes to add, the graph 40 is checked that all the synchronous endpoints are reachable in the synchronous graph. In the example of FIG. 4, the end points are not added to the graph 40. Both end points from the processes 13, 18 are not reachable. An error is raised with the names of any missing synchronous endpoints. The error indicates that there are situations with the new machine configuration where the process 13 will never finish.

The cross product 40 of FIG. 4, with or without graphs for the control process 18 and/or machine process 13, is output and/or used to correct the synchronization. FIG. 5 shows another example output for the synchronization matching.

The cross-product graph 40, the graph of the machine process 13, and the graph of the control process 18 are output. Additional, different, or fewer graphs may be output. A mismatch message 50 is provided listing the various incompatibilities found when comparing graphs. Other outputs, such as a notice regarding just that an incompatibility exists or just the incompatibilities without the graphs may be provided.

The output is used to manually correct. A programmer may review and correct the programming of the controller 16 and/or the machine 11 to provide for matching (i.e., remove the incompatibility). Alternatively or additionally, the matching processor performs the fix automatically. A vertex and/or synchronization point may be added.

Based on the interface matching, the synchronization matching, and/or any other matching, any determined incompatibilities are indicated. The incompatibility of the production machine 11 with the controller 16 and/or another machine are indicated. For example, the incompatibility is indicated as a missing name or unit, a mismatch of a name or unit, or combinations thereof. As another example, the incompatibility is indicated as a missing synchronization point and/or end point.

The display 21 of FIG. 1 is a monitor, liquid crystal display, plasma screen, projector, printer, or other device for outputting information to be viewed by an engineer or programmer. The display 21 is configured by the processor 19 or other processor to display any incompatibilities 22 or to indicate compatibility. Interface and/or synchronization information may be output. For example, images of FIGS. 3 and/or 5 are displayed together or in sequence. Other incompatibility information may be displayed, such as showing any errors without more.

In alternative embodiments, the incompatibility is used to automatically or semi-automatically correct the interface and/or process. A software converter or adaptor is linked to the parameter and/or the process is changed to remove the incompatibility. The change may be displayed for confirmation by a programmer. The incompatibility may or may not be displayed as part of the correction.

The processors 14, 19 (e.g., the matching processor) are configured by software, firmware, and/or hardware. The processors 14, 19 are each a single processor or multiple processors. Digital signal processors, application specific integrated circuits, field programmable gate arrays, general processors, signal processors, digital circuits, analog circuits, other processing devices, or combinations thereof may be used as the processors 14, 19. The processors 14, 19 are configured to use data from the interfaces 12, 17, the memories 15, 20, and/or from communications between the controller 16 and the machine 11 to follow the processes 13, 18.

The memories 15, 20 are each a cache, buffer, RAM, removable media, hard drive, or other computer readable storage media. The memories 15, 20 are controlled or formatted by the respective processors 14, 19 or another processor. Each memory 15, 20 may be distributed.

The memories 15, 20 are configured to store data used by the respective processors 14, 19. For example, the interfaces 12, 17, the control process 18, the machine process 13, matches, cross-product graph, links, substitutions, unification information, synchronization information, or other information are stored.

In one embodiment, the memories 15, 20 store instructions for programming the respective processors 14, 19. The instructions for implementing the processes, methods, and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

FIG. 6 shows one embodiment of a method for skill matching in an industrial control system. Machine and controller interfaces are matched. An augmented unification is used where parameters or characteristics of parameters may be optional in the matching. The augmented unification operates on machine interfaces and corresponding machine interface parameters.

FIG. 7 shows another embodiment of a method for skill matching in an industrial control system. The synchronization function between devices is matched. For example, calls or receipt of control or confirmation between procedures for two or more devices are examined to assure compatibility. A cross-product graph of the procedures is checked for incompatibilities against the procedures used to form the cross-product graph.

The methods of FIGS. 6 and 7 are implemented separately or together for a given pair or group of devices. The method of FIG. 6 may be performed without the method of FIG. 7 or vice versa. Additional incompatibility checks may be performed.

The methods of FIGS. 6 and 7 are implemented by the system of FIG. 1 or another system. A person may perform acts 60 and 70. A processor (e.g., server, computer, engineering workstation, or control system) may perform the comparisons of acts 62 and 72 and the identifications of acts 64 and 74. The devices (e.g., controllable industrial equipment and supervisor) or information from the devices are used in the comparison.

The acts of FIGS. 6 and 7 are performed in the order shown (numerically or top to bottom) or in another order. For example, acts 60 and 70 are performed after acts 64 and 74 and any corrections of incompatibilities.

Additional, different, or fewer acts may be performed than shown in FIGS. 6 and 7. For example, acts for remediating any incompatibility automatically, semi-automatically, or manually are provided. As another example, acts for displaying the incompatibilities and/or associated information are provided. In another example, acts 60 and/or 70 are not provided.

In acts 60 and 70, controllable industrial equipment is added, refit, or replaced. The manufacturing line for producing an object, chemical, gas, or other substance includes one or more pieces of controllable industrial equipment. The controllable industrial equipment is a machine or device for manufacturing or production, such as to alter a state of an object. The controllable industrial equipment follows a procedure to alter the state where the equipment is controllable by the supervisor. The procedure is responsive to data from the supervisor.

The addition, refit, or replacement results in a new interface and/or procedure. The addition may be for installing the manufacturing initially or adding a capability to an existing manufacturing. The refit may alter capability or control of the equipment, so result in a different interface and/or procedure. The replacement is by equipment that is different in some aspect resulting in a difference in the interface and/or procedure. Alternatively, the same interface and/or procedure are used.

In act 62, the processor compares parameters of an interface of a controllable industrial equipment to parameters of an interface of a supervisor of the controllable industrial equipment. Any characteristics of the parameters may be compared, such as units, names, variables, values, and/or associations. For example, parameter names, variables, and units of the interface of the controllable industrial equipment are compared with the parameter names, variables, and units of the interface of a supervisor of the controllable industrial equipment.

The comparison follows unification rules. The rules include substitution rules (when to substitute, what to substitute, and/or tracking of substitutions by parameter), uniqueness of name rules, a variable being substituted by variable or constant, a check for all variables being replaced by a constant, a check for all parameters except optional ones being paired between interfaces, and/or another rule. The unification rules link parameters between interfaces to assure that the parameters have a same meaning or labeling (e.g., same unit of measurement) in the different interfaces. Allowing optional matching allows for some parameters to be used in an interface without a linked or matched parameter in another interface. This benefits machine interfaces by allowing for local parameters in the machine for independent operation.

In act 64, the processor identifies an incompatibility of the interface of the controllable industrial equipment with the interface of the supervisor. The results of the comparison of act 62 are used to identify one or more incompatibilities. The names of unlinked parameters not labeled as optional, variables not assigned to constants or units, unlinked variables, variables assigned more than one constant or unit, and/or units or constants of the interfaces that are missing in one of the interfaces or have different units or constants between the interfaces are identified.

The unification is checked for incompatibility. Matching a same variable to more than one constant indicates an error. Variables that are not matched to a constant indicates an error. The comparison identifies any inconsistencies between the interfaces. The use of optional labeling for a parameter in one interface not occurring in another interface avoids indication of incompatibility.

In act 72 of FIG. 7, the processor compares a process model of the controllable industrial equipment to a process model of the supervisor of the controllable industrial equipment. The process models are compared to determine whether the models are synchronized. Since the processes may rely on communications between the controllable industrial control equipment and the supervisor (controller or control system), the comparison is to determine whether the process models interact properly, avoiding conflict or failures in the process models.

The comparison of the process modules is based on generation of a synchronous graph of a cross product of the process model of the controllable industrial equipment with the process model of the supervisor. The synchronous graph represents the process models operating together. Any missing communications, end points, or other functions of the process in the cross-product graph indicates incompatibility.

In act 74, the processor identifies one or more incompatibilities of the process model of the controllable industrial equipment with the process model of the supervisor. The identification is based on the comparison. The comparison indicates any failure in synchronization between the process models.

The synchronization graph is compared to each of the process models. Any synchronization error indicates an incompatibility. A synchronization point in one of the process models not in the synchronization graph indicates an error. A missing termination (e.g., end state) to the process not in the synchronization model indicates an error. It might be required that at least one of the possible end states in a process is reachable, and not necessarily all of them, depending on the application. Any incompatibility where one of the processes will not finish or where a synchronization or communication is not reachable is identified.

Any identified incompatibilities from any comparison are output so that a programmer may correct an interface or process model. Alternatively, the correction is automatically performed. After correction, the addition, refit, and/or replacement of the controllable industrial equipment in the manufacturing line will be performed with less downtime due to interface or process model incompatibility. The controllable industrial equipment operates with the supervisor in manufacturing using the interfaces and process models due to confirmation of compatibility.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A system for skill matching in industrial control, the system comprising:
    a production machine in an industrial production line, the production machine having a production machine interface responsive to a plurality of first parameters and having a production machine process responsive to first information;
    a controller of the production machine, the controller having a controller interface responsive to a plurality of second parameters and having a controller process responsive to second information; and
    a matching processor configured to first match the first and second parameters and to second match synchronization of the production machine process with the controller process based on exchange of the first and second information between the controller and the production machine, the matching processor configured to indicate an incompatibility of the production machine with the controller based on the first match, the second match, or both the first match and the second match.

2. The system of claim 1 wherein the production machine comprises a machine in a manufacturing process.

3. The system of claim 1 wherein the controller comprises a supervisor.

4. The system of claim 1 wherein the matching processor is part of the production machine.

5. The system of claim 1 wherein the matching processor is part of the controllers.

6. The system of claim 1 wherein the first and second parameters each comprise a name, value, and unit, and wherein the matching processor is configured to perform the first match based on compatibility of the names and units of the first parameters with the names and units of the second parameters.

7. The system of claim 6 wherein the compatibility is based on all the first parameters linked to all the second parameters except for at least one of the first and second parameters labeled as optional.

8. The system of claim 6 wherein the first match is for the production machine interface.

9. The system of claim 6 wherein the matching processor is configured to perform the first match based on the names of the first and second parameters, names of linked variables, the units of the first and second parameters, and at least one substitute based on the names of the linked variables and/or the units.

10. The system of claim 9 wherein the matching processor is configured to store an indication of at least one substitute.

11. The system of claim 6 wherein the matching processor is configured to indicate the incompatibility as a missing name, value or unit, a mismatch of a name, value or unit, or combinations thereof.

12. The system of claim 1 wherein the production machine process and the controller process each comprise steps and synchronization points, the synchronization points of the production machine responsive to the first second information from the controller and the synchronization points of the controller responsive to the first information from the production machine, and wherein the matching processor is configured to perform the second match for the synchronization based on the steps and synchronization points.

13. The system of claim 12 wherein the matching processor is configured to perform the second match as a synchronous cross product of the controller process with the production machine process.

14. The system of claim 13 wherein the matching processor is configured to perform the synchronous cross product based on starting points of the steps for the production machine process and the controller process and labeling of links between the steps as internal or the synchronization points.

15. The system of claim 13 wherein the matching processor is configured to indicate the incompatibility based on the second match where the synchronous cross product does not include one of the synchronization points of the production machine process or the controller process or does not include an end point of the production machine process or the controller process.

16. A method for skill matching in an industrial control system, the method comprising:
comparing, by a processor, a process model of a controllable industrial equipment to a process model of a supervisor of the controllable industrial equipment; and
identifying by the processor, an incompatibility of the process model of the controllable industrial equipment with the process model of the supervisor based on a result of the comparing.

17. The method of claim 16 wherein comparing comprises generating a synchronous graph of a cross product of the process model of the controllable industrial equipment with the process model of the supervisor.

18. The method of claim 16 wherein identifying comprises identifying the incompatibility as a missing synchronization point of the process model of the controllable industrial equipment or the process model of the supervisor and/or identifying a missing termination of the process model of the controllable industrial equipment or the process model of the supervisor.

19. A method for skill matching in an industrial control system, the method comprising:
comparing, by a processor, parameters of an interface of a controllable industrial equipment to parameters of an interface of a supervisor of the controllable industrial equipment; and
identifying, by the processor, an incompatibility of the interface of the controllable industrial equipment with the interface of the supervisor based on a result of the comparing.

20. The method of claim 19 wherein comparing comprises comparing names, variables, values, and units of the interface of a controllable industrial equipment with the names, variables, values, and units of the interface of a supervisor of the controllable industrial equipment, and wherein identifying comprises identifying names, variables, values or units of the interfaces that are missing in one of the interfaces or have different units between the interfaces.

\* \* \* \* \*